M. HOLLINGER.
ANIMAL TRAP.
APPLICATION FILED MAY 28, 1913.
1,122,391.
Patented Dec. 29, 1914.
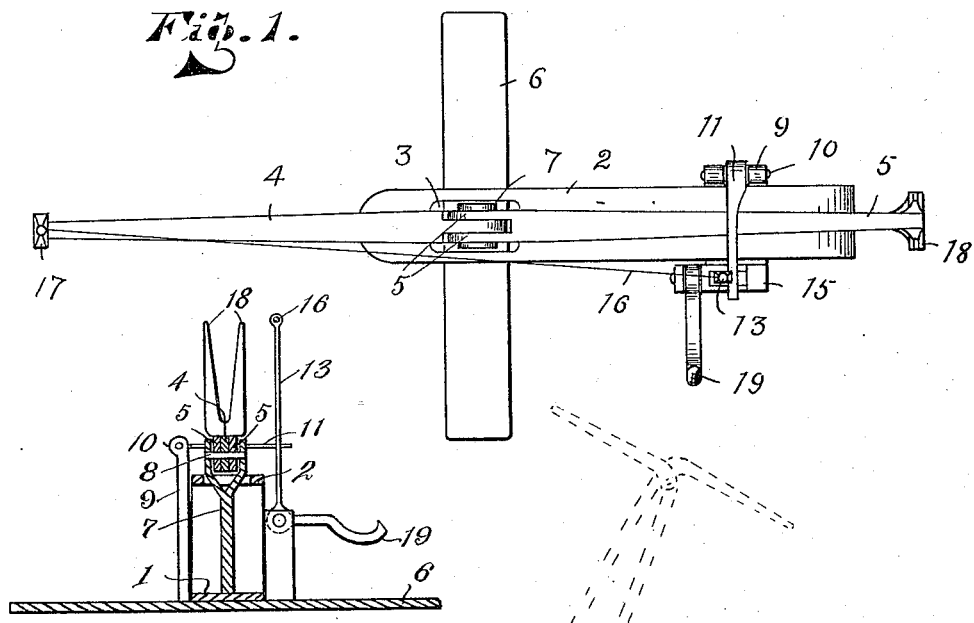
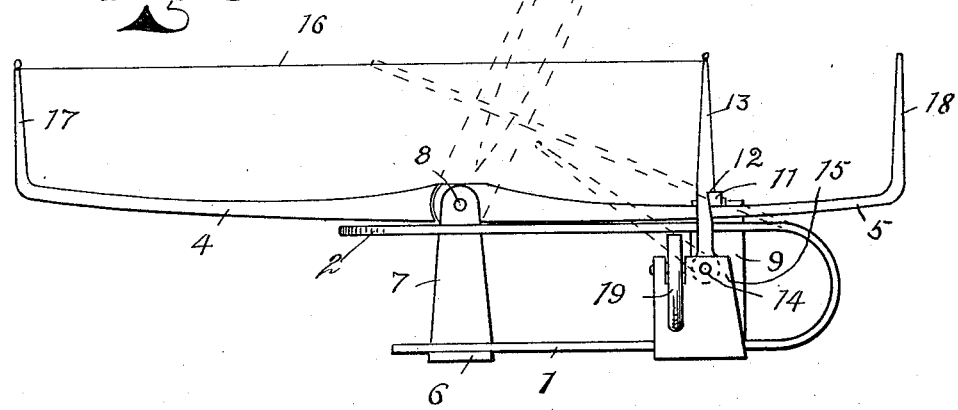
WITNESSES:
INVENTOR.
M. Hollinger
BY A. S. Pattison
ATTORNEY.

UNITED STATES PATENT OFFICE.

MICHAEL HOLLINGER, OF DULUTH, MINNESOTA.

ANIMAL-TRAP.

1,122,391. Specification of Letters Patent. Patented Dec. 29, 1914.

Application filed May 28, 1913. Serial No. 770,551.

*To all whom it may concern:*

Be it known that I, MICHAEL HOLLINGER, a citizen of the United States, residing at Duluth, in the county of St. Louis and State of Minnesota, have invented certain new and useful Improvements in Animal-Traps, of which the following is a specification, reference being had therein to the accompanying drawing.

My invention relates to improvements in animal traps.

The object of my invention is to provide a trap that will cover as wide an expanse of catching area as possible and one that will ordinarily catch the animal about the body in preference to the leg or foot thus insuring of the positive holding of the animal after it is caught.

Another object of my invention is to provide a simple, cheap and more effective trap of this character leaving certain details of structure hereinafter more fully set forth.

In the accompanying drawings: Figure 1 is a top plan view of my improved trap as it appears when set. Fig. 2 is a side elevation of Fig. 1 showing the parts in dotted lines as they would appear when the trap is sprung.

Referring now to the drawings the body of the trap is formed of a U-shaped spring member formed of a lower side 1 and the upper side 2, the said lower side forms a part of the base of the trap and rests flat upon the ground or other object upon which the trap is set. The upper portion 2 of the body portion forms the spring for closing the jaws of the trap as will be hereinafter more fully described.

The free end of the upper portion 2 is provided with an elongated opening 3 and through which the jaws 4 and 5 are adapted to extend. The base 1 adjacent its free end is provided with a cross piece 6 on its under face to form supporting means to keep the trap right side up. The said base above the cross piece is provided with a standard 7 rigidly secured to the upper face thereof, and having its upper end bifurcated at 7 and between the arms of which are pivoted the jaws 4 and 5 by means of the pivot 8. The opening 3 in the upper side 2 as heretofore stated is of an elongated form and surrounds the standard below the jaws but is normally exerting an upward pressure on the jaws due to the spring of the metal of which the two arms 1 and 2 are made.

When the trap is set it will be seen that the jaws 4 and 5 are parallel with the end 1 of the arm at right angles to the standard but the arm 2, as heretofore described is at all times exerting an upward pressure on the jaws and tending to close the same as shown in dotted line Fig. 2. The opening 3 in the end 2 as heretofore stated is of an elongated form and is of such a size to allow said end to pass upwardly over the jaws and force the same together as clearly shown in dotted lines Fig. 2.

The base 1 is provided with a standard 9 to which is pivotally connected the trigger 11 which when closed down over the jaw 5 holds the arm in its downward position and the same resting upon the end 2 holds this end in its downward position and the jaw 4 by force of gravity remains in the position shown in Fig. 2 of the drawings. The base 1 is provided on its opposite edge from the standard 9 with a second standard 15 to which is pivoted at 14 the lever 13. The said lever is provided with a notch 12 and the said lever being pivoted at right angles to the trigger, it will be seen that the lever swinging over so that the notch passes over the trigger and the same is held in its downward position holding the jaw 5 in its downward or set position. The said lever 13 is of a height to extend in a horizontal line with the upper end of the lateral extension 17 of the jaw 4 and connected to the upper end of the extension 17 and the upper end of the lever 13 is a string 16 so placed within the path of the animal to be caught that the engagement thereof by the animal pulls the lever 13 inwardly and releases the trigger 11. The releasing of the trigger allows the member 2 to force the jaws 4 and 5 upwardly and the opening 3 allows the member 2 to travel upwardly over the jaws and firmly holding the animal between the same.

The outer end of the arm 5 is turned upwardly similar to 17 of the jaw 4 except that it is bifurcated and designated to straddle the end 17 of the jaw 4 when the two impinge each other, thus preventing their twisting apart by the efforts of the animal to escape.

A catch or safety lock 19 is pivoted to the standard 15 adjacent the lever 13 which may be thrown up over the jaw 5 to hold it while the trap is being set which is found very convenient in careful adjustment of the setting mechanism and after which latter is performed, the catch is thrown back out of the way as shown in Fig. 1.

Having thus described my invention what I claim and desire to secure by Letters Patent is:

1. An animal trap comprising a U-shaped spring, a base plate attached to one end of the spring transverse thereof, a standard carried by the spring, jaws carried by the standard and extending transverse the base plate and normally held closed by the spring, a setting means extending across one of the jaws, and a string attached to the setting means and one of the jaws substantially as shown and described.

2. An animal trap comprising a U-shaped spring, a base plate attached to one end of the spring transverse thereof, an upright standard attached to the spring and passing through the opposite end of the spring, two jaws pivoted to the standard and extending transverse the base plate and normally forced together by the upward action of the spring, a trigger holding one of the jaws downwardly, a lever for locking the trigger, and a string connected to the upper end of the lever and extending longitudinal of the jaws, and connected to the end of one of the jaws.

3. An animal trap comprising a U-shaped spring, a base plate attached to one end of the spring transverse thereof, an upright standard attached to the spring and passing through the opposite end of the spring, two jaws pivoted to the standard transverse the base plate and normally forced together by the upward action of the spring, a trigger pivoted to the spring and extending across one of said jaws, a vertical lever pivoted to the spring and having a notch adapted to pass over the trigger, a string connected to the upper end of the lever and extending horizontally across the jaws and connected to the outer end of the free jaw and a catch for locking the trigger.

In testimony whereof I hereunto affix my signature in the presence of two witnesses.

MICHAEL HOLLINGER.

Witnesses:
 HENRY MAXEMER,
 S. GEO. STEVENS.

Copies of this patent may be obtained for five cents each, by addressing the "Commissioner of Patents, Washington, D. C."